United States Patent [19]
Keyser

[11] 3,825,037
[45] July 23, 1974

[54] JACKING PIPE

[75] Inventor: Lewis R. Keyser, Dayton, Ohio

[73] Assignee: Price Brothers Company, Dayton, Ohio

[22] Filed: Apr. 5, 1972

[21] Appl. No.: 241,149

[52] U.S. Cl. .............................................. 138/175
[51] Int. Cl. ............................................ F16l 9/08
[58] Field of Search ........... 138/109, 172, 174, 175; 264/228, 229, 310, 311; 61/43

[56] References Cited
UNITED STATES PATENTS

| 1,014,735 | 1/1912 | Wortham | 138/175 |
| 1,267,835 | 5/1918 | Zwicker | 138/175 |
| 1,413,008 | 4/1922 | Cuozzo | 138/175 |
| 1,455,250 | 5/1923 | Hirsh et al. | 138/175 |
| 1,609,660 | 12/1926 | Phelps | 138/175 |
| 3,419,047 | 12/1968 | Osweiler | 138/175 |

*Primary Examiner*—Herbert Goldstein
*Attorney, Agent, or Firm*—Biebel, French & Bugg

[57] ABSTRACT

Reinforced concrete pipe especially adapted for jacking operations. To resist the shear forces generated in the bell and spigot sections of the pipe during jacking operations, radial reinforcing strands are embedded in the pipe about its entire circumference at both the bell of the pipe and the opposite end of the pipe adjacent the spigot shoulder.

11 Claims, 6 Drawing Figures

PATENTED JUL 23 1974   3,825,037

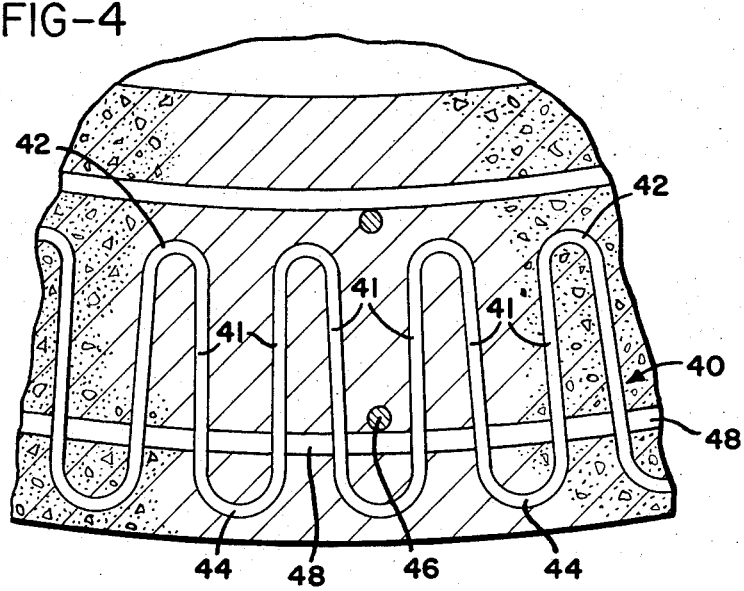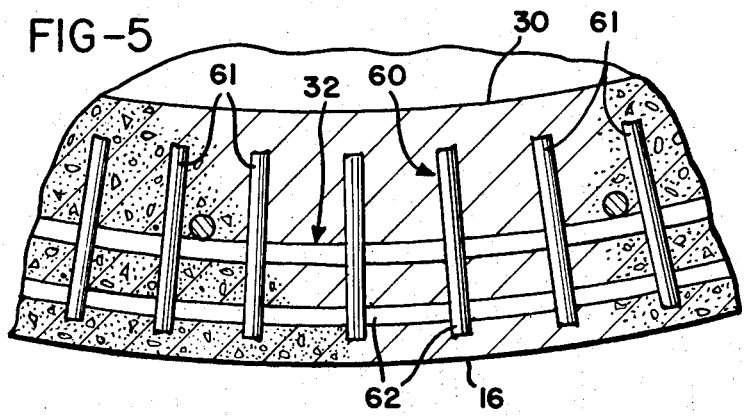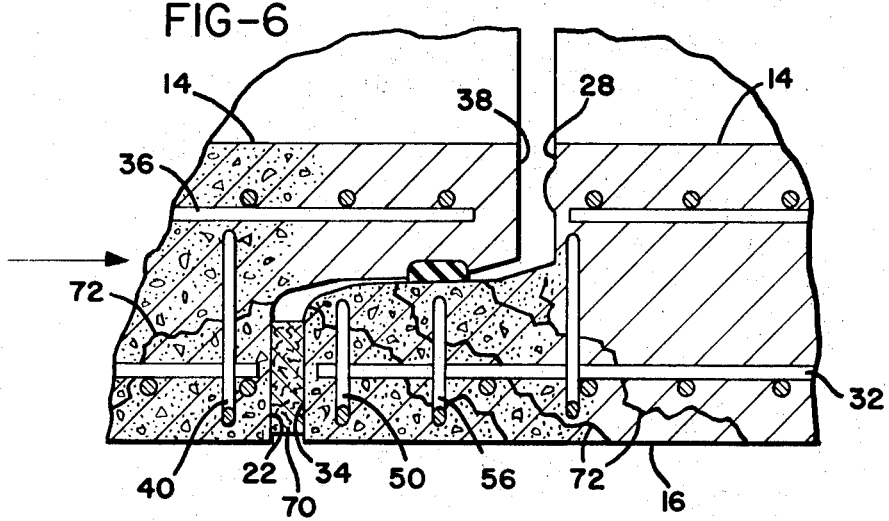

3,825,037

JACKING PIPE

BACKGROUND OF THE INVENTION

Reenforced concrete pipe consists of a main body of concrete and, usually, inner and outer, cylindrical cages of reenforcing mesh. Large pipe supporting heavy loads may also have reenforcing stirrups at the crown and invert to resist diagonal tension from shear and radial tension. Such pipe, which is principally used for culverts, storm drains and sewers, is generally provided with a bell at one end and a spigot at the opposite end which may or may not carry a gasket and is inserted in the bell. While the majority of reenforced concrete pipe is laid in open ditches or trenches, in some instances the digging of open ditches or trenches is impractical.

For example, where it is desired to install a pipe line under a heavily traveled road or railway it is desirable to do so without interrupting traffic. In thise situations resort may be had to "jacking," in which the pipe sections are pushed, usually by heavy duty hydraulic jacks, through a slightly oversize tunnel bored just ahead of the lead pipe section.

As each pipe section is "jacked" into the tunnel, an additional section is brought into place, its spigot inserted in the bell of the previously installed section, and the pipe string forced into the tunnel by exerting force on the last section in the string. For a detailed description of operations of this type reference may be had to "Jacking Reenforced Concrete Pipe Lines," published by the American Concrete Pipe Association, 1815 North Fort Meyer Drive, Arlington, Virginia.

During jacking operations, it will be apparent that the compressive forces exerted on the pipe sections are substantial, particularly when it is realized that each pipe section may be several feet in diameter, typically in the range of 4 to 12 feet, and that the finished pipe line may run several hundred feet in length.

Compounding the problem of shear forces exerted on the bell and spigot sections of the pipes during the jacking operations is the fact that there is rarely a perfect mating of the surfaces of the bell and spigot due to manufacturing tolerances and diviation of the pipe line from a perfectly straight line. This, of course, may result in essentially line contact at certain points on the opposing surfaces of the bells and spigots, intensifying the shear forces at these points.

As noted above, reenforced concrete pipe is generally provided with inner and outer cages of reenforcing mesh and under heavy load conditions may have stirrups at the crown and invert of the pipe section to inhibit shear and radial tension cracks. See for example, U.S. Pat. Nos. 3,411,543; 3,411,544; 3,411,545; 3,411,546; and 3,419,047. Also, with reference to reenforcing generally, see U.S. Pat. Nos. 553,305; 733,631; 803,852; and 1,442,160.

While reenforcing of the type disclosed in at least the more recent patents listed above is effective to resist field loads and loads encountered during three edge bearing tests, the shear forces exerted during jacking operations impose different requirements on the pipe reenforcement. Thus, a common malfunction during jacking operations is a shearing, at approximately a 45° angle, through the outside spigot shoulder and the bell of the pipe. As this type of failure progresses the bell telescopes over the spigot shoulder and both the bell and spigot ends are subjected to spalling. Obviously, a pipe line in which sections have failed in this manner is unacceptable and those sections which have failed must be removed and replaced at great expense and loss of time.

SUMMARY OF THE INVENTION

The present invention provides a reenforced concrete pipe construction wherein the shear forces generated during jacking operations are resisted by radial reenforcing means embedded in the pipe sections at the spigot shoulder and the bell. While the radial reenforcing means may be formed as a continuous, sinuous strand of the type shown, for example, in U.S. Pat. No. 3,411,543, it is embedded in an entirely different portion of the pipe, in an entirely different manner to overcome an entirely different problem.

Thus, contrary to conventional practice, the substantially straight portions of the radial reenforcing means, which constitute radial reenforcing strands, extend radially inwardly of the pipe from the area between the outer reenforcing cage and the outer wall surface of the pipe to, in effect, tie the outer portions of the pipe to the inner portions thereof. If, as is usually the case, the pipe is provided with an inner as well as an outer cage, the radial reenforcing strands terminate outwardly of the inner cage, again contrary to conventional practice.

Additionally, and also contrary to conventional practice, the radial reenforcing is embedded in the pipe about the entire circumference thereof, but, only adjacent the ends of the pipe. In this regard, it will be noted that the radial reenforcing is effective only if positioned in the pipe ends within a relatively short distance from the ends of the affected areas.

For example, the outermost radial reenforcing at both the bell and spigot is most effective if placed within ½ to 1½ inches of the end of the bell or the shoulder of the spigot. Additional layers of radial reenforcing may be required at the bell end spaced at approximately three-fourths of the bell wall thickness. The multiple layers of radial reenforcing in the bell prevent the concrete of the bell wall from splitting and shearing off, thereby failing to carry its heavy thrust load beyond the depth of the bell to the thicker main body of the pipe.

Where a continuous, sinuous strand is used as radial reenforcing, the curved ends of each loop in the bell wall should extend to within ¼ to ¾ inches of the outside and inside surface of the concrete. The curved ends at the spigot and the one at the bell beyond the bell socket should extend to within ¼ to ¾ inches of the outside concrete surface of the wall of the main body of the pipe and just short of the inside cage in the opposite direction.

The individual radial reenforcing strands are fairly closely positioned with respect to each other, on the order of approximately 1 to 3 inches apart, and preferably, the radial reenforcing means is attached to the outer reenforcing cage, usually by welding, at a sufficient number of points to maintain its position and rigidity.

While a sinuous strand may be used as radial reenforcing means, a section of ordinary wire mesh servered to provide a plurality of radial reenforcing strands interconnected by a single crossing strand adjacent one end of the radial strands, may also be used in accordance with the present invention as will appear from the detailed description below.

BRIEF DESCRIPTION OF THE DRAWINGS

FIG. 4 is a cross sectional view taken along line 4—4 of FIG. 2;

FIG. 5 is a cross sectional view through a pipe section showing another preferred embodiment; and FIG. 6 is a cross sectional view showing a portion of a joint formed between two pipe sections in accordance with the present invention.

DESCRIPTION OF THE PREFERRED EMBODIMENTS

Figure 1:
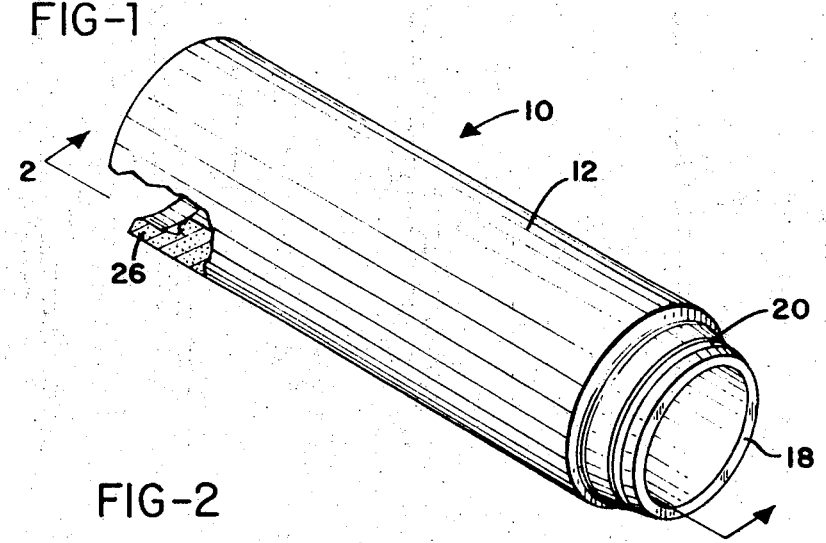
FIG. 1 is a perspective view of a reenforced concrete pipe section.
Figure 2:
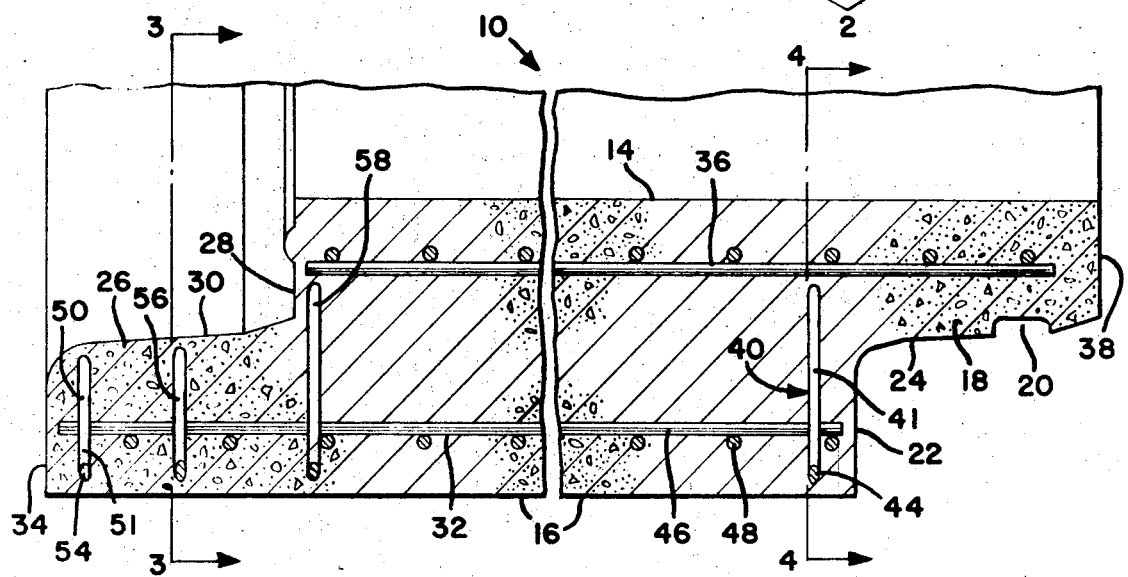
FIG. 2 is a cross sectional view taken along line 2—2 of FIG. 1.

As seen in FIGS. 1 and 2 of the drawings, a pipe section 10 in accordance with the present invention includes a main body section 12 having an inner wall surface 14 and an outer wall surface 16. An extension of the main body section at one end thereof adjacent the inner wall surface 14 defines an annular spigot 18 which may have a gasket receiving groove 20, although where a mortar joint is used the gasket and groove will be omitted. The spigot 18 terminates at a spigot shoulder 22 which extends radially outwardly from an outer diameter 24 of the spigot to the outer wall surface 16 of the pipe section.

At the opposite end of the pipe section an extension of the main body section adjacent the outer wall 16 thereof defines an annular bell 26 terminating in an annular bell socket bottom 28 extending radially inwardly from an inner diameter 30 of the bell to the inner wall surface 14. An outer cylindrical cage of reenforcing wire mesh 32 is embedded in the pipe adjacent the outer wall surface 16 and extends longitudinally of the pipe from adjacent the spigot shoulder 22 to a shoulder 34 of the bell.

Usually the pipe section will be provided with an inner cylindrical cage 36 of reenforcing wire mesh embedded in the pipe adjacent the inner wall 14 thereof and extending from the bell socket bottom 28 to an end 38 of the spigot. Additionally, the concrete pipe section may be provided with stirrups of the type disclosed in some of the above noted patents, although this type of reenforcing has been omitted for purposes of clarity since it is not germane to the present invention.

Unlike prior art constructions, however, the pipe section in accordance with the present invention is provided with radial reenforcing adjacent each end of the pipe. Thus, and as best seen in FIGS. 2 and 4, a substantially continuous strand of radial reenforcing 40 is embedded in the pipe section adjacent the spigot shoulder 22 and extending about the entire circumference of the pipe spaced inwardly from the spigot shoulder 22 a distance of approximately ½ to 1½ inches.

The radial reenforcing consists of a series of substantially straight radial reenforcing strands 41 interconnected at their inner and outer ends by substantially semi-circular connecting portions 42 and 44, respectively. Preferably, the radial reenforcing strands 41 are spaced apart from each other approximately 1 to 3 inches and it will be noted that the inner connecting portions 42 are slightly smaller than the outer connecting portions 44.

The radial reenforcing is preferably attached to the outer reenforcing cage by welding at a sufficient number of points to maintain the position and rigidity of the reenforcement. In this regard, it will be seen that the radial reenforcing may be inserted through the wire mesh of the outer cylindrical cage with the radial reenforcing strands 40 and connecting strands 42 inserted between the longitudinals 46 and circumferentials 48 of the outer cage so that, in the finished pipe, the connecting portions 44 are positioned intermediate the outer reenforcing cage 32 and the outer wall surface 16. Additionally, if an inner reenforcing cage 36 is provided, as will usually be the case, the connecting portions 42 will be spaced outwardly thereof.

Radial reenforcing of the same type utilized adjacent the spigot shoulder is also embedded in the bell 26 of the pipe section. Thus, as best seen in FIGS. 2 and 3 of the drawings, radial reenforcing 50 consisting of substantially straight, radial reenforcing strands 51 interconnected by substantially semi-circular connecting portions 52 and 54, are embedded in the bell 26 with the connecting portions 54 and outer ends of the radial reenforcing strands 51 positioned between the outer reenforcing cage 32 and the outer wall surface 16.

The radial reenforcing means in the bell is preferably attached by welding to the outer reenforcing cage 32 at a sufficient number of points to maintain the position and rigidity of the reenforcement and extends radially inwardly to a point spaced outwardly from the inner diameter 30 of the bell. The length of the radial reenforcing strands 51 will usually be somewhat less than the length of the radial reenforcing strands 41. However, the strands 51 are also preferably spaced from each other a distance of one to three inches and positioned inwardly from the shoulder 34 of the bell a distance of from ½ to 1½ inches.

The bell may also be provided with a second annularly shaped row of radial reenforcing 56 spaced inwardly from the outermost row 50, as best seen in FIGS. 2 and 6 of the drawings, and of substantially the same configuration as the reenforcing 50. It will also be seen in FIGS. 2 and 6 of the drawings that a third row 58 may be provided, of somewhat greater amplitude than the amplitude of reenforcing 50 and 56 and similar to the reenforcing 41 at the spigot. Where multiple rows of radial reenforcing are provided they should be spaced from each other no more than three-fourths the bell wall thickness to ensure that they intercept any cracks that form.

Figure 3:
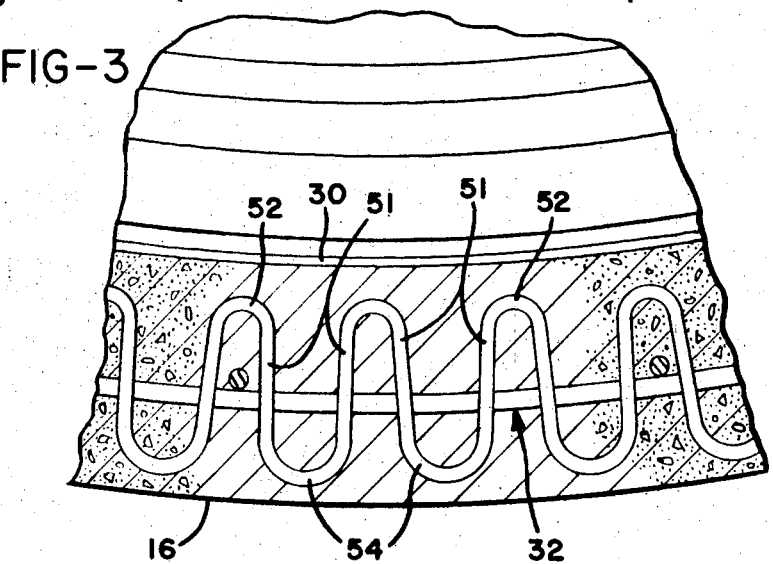
FIG. 3 is a cross sectional view taken along line 3—3 of FIG. 2.

While the reenforcing shown in FIGS. 3 and 4 is formed as a continuous strand, it will be noted that the radial reenforcing may also take the form shown at 60 in FIG. 5 of the drawings. Thus, a plurality of substantially straight strands 61 are provided interconnected by a circumferentially extending strand 62 crossing the outer ends of the radial reenforcing strands 61 and attached thereto by welding.

The radial reenforcing means 60 is embedded in the pipe section 10 in the same manner as the radial reenforcing means 40 and 50, with the radial reenforcing strands 61 extending from the area between the outer reenforcing cage 32 and the outer wall surface 16 inwardly of the pipe section to a point spaced outwardly from the inner reenforcing cage 36 or the inner diameter 30 of the bell, as shown in FIG. 5. The reenforcing means 60 may conveniently be formed from a sheet of wire mesh by severing the longitudinals on opposite sides of a circumferential to give the configuration shown in FIG. 5 of the drawings.

In either case, as the pipe line is jacked into place the spigot of each new section of pipe is inserted in the bell of the previously installed section and a cushion of a suitable, nonrigid material, as at 70, is inserted between the spigot shoulder 22 and the shoulder 34 of the bell to act as a cushion and, to some extent, distribute the load about the circumference of these two areas. A pushing force is then exerted on the bell shoulder of the last pipe section, forcing all sections ahead of the last section through a tunnel dug slightly in advance of the lead section and slightly greater in diameter than the outer diameter of the pipe.

Due to the heavy thrust forces longitudinally of the pipe, shear forces develop in the bell and spigot shoulders of each pipe, and there will be a tendency for the pipe to shear along approximately 45° lines, as indicated at 72 and 74 in FIG. 6 of the drawings. This shearing action is resisted by the radial reenforcing means 40, 50, 56, 58, and 60, preventing failure of the pipe sections and the additional expense and loss of time incurred through replacement of failed sections. In this regard it will be seen that spacing the rows of radial reenforcing in the bell at three-fourths of the bell wall thickness ensures that the cracks, which tend to develope at approximately 45° lines, are intercepted.

In a typical installation the pipe sections may have an outside diameter of approximately 72 inches and an inside diameter of approximately 60 inches. The radial reenforcing at the spigot end of the pipe may consist of eight gauge reenforcing wire having an amplitude, that is, the distance from the outermost surface of a connecting portion 42 to the outermost surface of a connecting portion 44, of 3¾ inches and an average spacing between the radial reenforcing strands of approximately 1 inch.

The connecting portions 44 may be spaced inwardly from the outer wall surface approximately ¼ inch and the connecting portions 42 spaced outwardly from the longitudinals of the inner reenforcing cage approximately ½ inch, while the radial reenforcing may be positioned inwardly from the spigot shoulder 22 a distance of approximately ¾ inch.

At the opposite end of the pipe section one row of radial reenforcing 50 may be positioned inwardly from the shoulder 34 a distance of approximately ¾ inch and the next row 56 positioned inwardly from the outermost row 50 approximately 2½ inches. The amplitude of the radial reenforcing in the bell may be 2¾ inches with the spacing between the radial reenforcing strands 50 again approximately one inch. The outer connecting portions 54 may be embedded in the bell a distance of approximately ¼ inch from the outer wall surface while the inner connecting portions 42 are spaced approximately ¼ inch inwardly from the inner diameter 30 of the bell.

Tests of pipe provided with radial reenforcing have indicated markedly superior results over conventional pipe when subjected to stresses of the type imposed during typical jacking operations. Thus, pipe constructed in accordance with the present invention provides superior resistance to shear forces during jacking and eliminates much of the additional expense and time that are often incurred in replacing failed pipe sections during jacking operations.

While the products herein described constitute preferred embodiments of the invention, it is to be understood that the invention is not limited to these precise products, and that changes may be made therein without departing from the scope of the invention.

What is claimed is:

1. Reenforced concrete pipe construction comprising:
   a. a cylindrical main body section having inner and outer wall surfaces,
   b. an extension of said main body section at one end thereof adjacent said inner wall surface defining an annular spigot terminating in an annular spigot shoulder extending from an outer diameter of said spigot radially outwardly to said outer wall surface,
   c. an extension of said main body section at an opposite end thereof adjacent said outer wall surface defining an annular bell having an inner diameter greater than said outer diameter of said spigot and extending longitudinally of said pipe from a shoulder of said bell to an annular bell socket bottom projecting from said inner diameter of said bell radially inwardly to said inner wall surface,
   d. an outer cylindrical cage of reenforcing mesh embedded in said pipe adjacent said outer wall surface thereof and extending longitudinally of said pipe from adjacent said spigot shoulder to adjacent said shoulder of said bell,
   e. a plurality of radial reenforcing strands,
   f. said radial reenforcing strands being embedded in said bell and in said main body section at said spigot shoulder,
   g. said radial reenforcing strands being positioned in closely spaced relationship to each other about the entire circumference of said pipe, and
   h. said radial reenforcing strands extending from an area intermediate said outer wall surface and said outer cylindrical cage radially inwardly of said pipe toward said inner wall surface thereof.

2. The construction of claim 1 further comprising:
   a. means joining said reenforcing strands to each other.

3. The construction of claim 2 wherein said joining means comprises:
   a. substantially semi-circular connecting portions connecting adjacent ends of said radial reenforcing strands.

4. The construction of claim 2 wherein said joining means comprising:
   a. a continuous strand extending circumferentially within said pipe, crossing said radial reenforcing strands and attached thereto.

5. The construction of claim 1 further comprising:
   a. means joining said radial reenforcing strands to said outer cage.

6. The construction of claim 1 further comprising:
   a. an inner cylindrical cage of reenforcing mesh embedded in said pipe adjacent said inner wall surface and extending longitudinally of said pipe,
   b. said radial reenforcing strands having inner ends terminating outwardly of said inner cage.

7. The construction of claim 1 wherein:

a. said radial reenforcing strands are spaced from each other circumferentially of said pipe approximately 1 to 3 inches.

8. The construction of claim 1 wherein:
a. said radial reenforcing strands are spaced inwardly from an outer end of said bell and said spigot shoulder a distance of from ½ to 1½ inches.

9. The construction of claim 1 wherein:
a. said radial reenforcing strands in said bell are arranged in a plurality of annular rings spaced apart from each other axially of said pipe.

10. The construction of claim 9 wherein:
a. said annular rings of radial reenforcing in said bell are spaced from each other no greater than ¾ the thickness of said bell.

11. Reenforced concrete pipe construction comprising:
a. a pair of reenforced concrete pipe sections each including:
 i. a cylindrical main body section having inner and outer wall surfaces,
 ii. means defining a bell at one end of said main body section,
 iii. means defining a spigot at the opposite end of said main body section receivable in said bell,
 iv. a cylindrical cage of reenforcing mesh embedded in said pipe adjacent said outer wall surface thereof,
 v. a plurality of radially extending reenforcing strands embedded in said bell about the entire periphery thereof and in said main body section adjacent said spigot about the entire periphery thereof,
 vi. said radially extending reenforcing strands extending from intermediate said reenforcing cage and said outer wall surface radially inwardly of said main body section to a point intermediate said cylindrical cage and said inner wall surface of said pipe, and
b. said spigot of one of said pipes being received in said bell of said other of the said pipes.

* * * * *